(12) United States Patent
Meeks et al.

(10) Patent No.: US 8,579,358 B2
(45) Date of Patent: Nov. 12, 2013

(54) ROUNDED AIR DAM FOR MAXIMUM AERODYNAMICS AND COOLING PERFORMANCE

(75) Inventors: Christopher D. Meeks, Greensboro, NC (US); Michael W. Maurer, Dublin, OH (US); Jason A. Widmer, Marysville, OH (US); James Robinson, Delaware, OH (US); Sukwon Kim, Camp Hill, PA (US); Kyle Stephen Mihok, Hilliard, OH (US); Jeremy Paul Lucas, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 13/239,074

(22) Filed: Sep. 21, 2011

(65) Prior Publication Data
US 2013/0069389 A1    Mar. 21, 2013

(51) Int. Cl.
*B62D 35/00* (2006.01)
(52) U.S. Cl.
USPC ............... 296/180.2; 296/180.1; 180/903
(58) Field of Classification Search
USPC ............... 296/180.1–180.5; 180/903
See application file for complete search history.

(56) References Cited

U.S. PATENT DOCUMENTS

| 4,527,812 | A | * | 7/1985 | McFadden | 280/402 |
| 4,702,079 | A | * | 10/1987 | Saito et al. | 60/599 |
| 4,976,489 | A | | 12/1990 | Lovelace | |
| 6,019,161 | A | * | 2/2000 | Travis | 165/41 |
| 6,282,769 | B1 | | 9/2001 | Longo et al. | |
| 6,874,842 | B2 | | 4/2005 | Hojna | |
| 6,997,490 | B2 | | 2/2006 | Evans et al. | |
| 7,011,780 | B2 | | 3/2006 | Hojna | |
| 7,055,638 | B2 | * | 6/2006 | Khalighi et al. | 180/116 |
| 7,178,859 | B2 | * | 2/2007 | Browne et al. | 296/180.5 |
| 7,390,038 | B2 | | 6/2008 | Campbell et al. | |
| 2005/0017520 | A1 | * | 1/2005 | Evans et al. | 293/120 |
| 2006/0048984 | A1 | * | 3/2006 | Pleune et al. | 180/68.4 |
| 2011/0181075 | A1 | * | 7/2011 | Glickman | 296/193.09 |
| 2011/0187151 | A1 | * | 8/2011 | Mackenzie et al. | 296/180.5 |
| 2012/0199316 | A1 | * | 8/2012 | Maurer et al. | 165/44 |
| 2012/0325324 | A1 | * | 12/2012 | Widmer et al. | 137/1 |
| 2012/0330513 | A1 | * | 12/2012 | Charnesky et al. | 701/48 |

FOREIGN PATENT DOCUMENTS

| EP | 1 514 717 B1 | 11/2008 |
| JP | 06-044776 Y2 | 11/1994 |

(Continued)

OTHER PUBLICATIONS

PCT/US2013/056559 International Search Report and Written Opinion of the International Searching Authority, mailed Feb. 28, 2013.

*Primary Examiner* — Lori Lyjak
(74) *Attorney, Agent, or Firm* — Fay Sharpe LLP (57) ABSTRACT

A modified air dam includes an integral spring-like, corrugate-shaped portion for absorbing impact forces imposed on the air dam. A lower portion of the air dam is generally planar and angled slightly from a vertical plane toward the front of the vehicle. The air dam also includes a rounded portion to provide a horizontal offset between upper and lower portions of the air dam and to direct airflow toward a bottom portion of the radiator. The air dam may also be curved side-to-side or employ an inverted, generally U-shaped portion as a first force absorbing region and a spaced rib that serves as a second force absorbing region. The generally U-shaped portion also advantageously extends over a fastener and mounting region of the air dam.

19 Claims, 7 Drawing Sheets

(56) References Cited

FOREIGN PATENT DOCUMENTS

| | | |
|---|---|---|
| JP | 2003-252255 A | 9/2003 |
| JP | 2006 88735 | 4/2006 |
| JP | 2007 216913 A | 8/2007 |
| JP | 2010 214998 | 9/2010 |
| KR | 2003 016827 A | 3/2003 |
| KR | 2003 033169 A | 5/2003 |
| KR | 2995 939900 A | 5/2006 |

* cited by examiner

ROUNDED AIR DAM FOR MAXIMUM AERODYNAMICS AND COOLING PERFORMANCE

BACKGROUND

This disclosure relates to automotive vehicles, and more particularly is directed to maximizing aerodynamics and/or cooling performance associated with automotive vehicles.

There is always a need to improve the aerodynamics associated with an automotive vehicle, not just from an aesthetic standpoint, but also to improve drag and fuel economy. Likewise, improved aerodynamics typically limits the number or size of openings into the vehicle to reduce the drag, and this in turn leads to less air being provided for cooling performance. For example, less air is made available to the engine compartment and therefore there is a need to improve the efficient handling of air entering into the automotive vehicle.

One example of a prior arrangement uses an air dam bolted to a bulkhead of the vehicle. The air dam directs the air to pass through a bottom region of the radiator and oftentimes as a dead zone is created because of the flow path of the air. Further, the air dam extends downwardly from the vehicle and is potentially exposed to possible structural damage if inadvertent forces are imposed on the air dam. By way of example only, contact with a curb or a steep angled portion of a driveway can result in undesired forces on the air dam. The fastener connection is intended to break or shear before any damage could result to the remainder the automotive vehicle, but nonetheless the air dam or connection of the air dam with the automotive vehicle is potentially exposed to damage.

Generally, the air dam is a vertically extending wall extending downwardly from the vehicle that air impinges on and is thereby directed upwardly into a bottom opening that communicates with the engine compartment and lower portion of the radiator. Although the air is directed and pulled from under the vehicle, a dead spot (i.e., region of reduced velocity airflow) develops in the engine compartment adjacent the bottom of the radiator as the air turns from a vertical direction from under the vehicle to a more horizontal direction through the radiator/condenser. The problem can result in extremely low air flow velocities thus rendering the lower portion of the radiator ineffective.

It is also recognized that different vehicle speeds will result in different air flow velocities through the vehicle. Thus, one orientation or of the air dam is not ideal for all situations. For example, one orientation may be desired to maximize the amount of air entering the engine compartment at a first vehicle speed while another orientation may be desired to streamline the airflow through the engine compartment at a second vehicle speed. However, existing air dam designs do not effectively address both situations.

Therefore, a need exists to increase the efficiency of cooling air entering the vehicle, and simultaneously improve the aerodynamic and drag impact.

SUMMARY

An apparatus for improving airflow through an engine compartment from a bottom opening of an automotive vehicle includes an air dam mounted in the engine compartment and extending generally vertically below a radiator. The air dam includes an integral spring-like portion for absorbing impact forces imposed on the air dam.

The apparatus for improving efficiency of cooling airflow entering an automotive vehicle includes an elongated air dam extending downwardly from beneath a radiator. The air dam has a mounting region cantilever-mounted adjacent the radiator and has a terminal end region that is horizontally offset therefrom.

A method of improving efficiency of cooling air flow entering automotive vehicle includes a step of providing an air dam that directs airflow toward a radiator and including a spring-like region in the air dam for absorbing impact forces imposed thereon.

DETAILED DESCRIPTION

Figure 1:
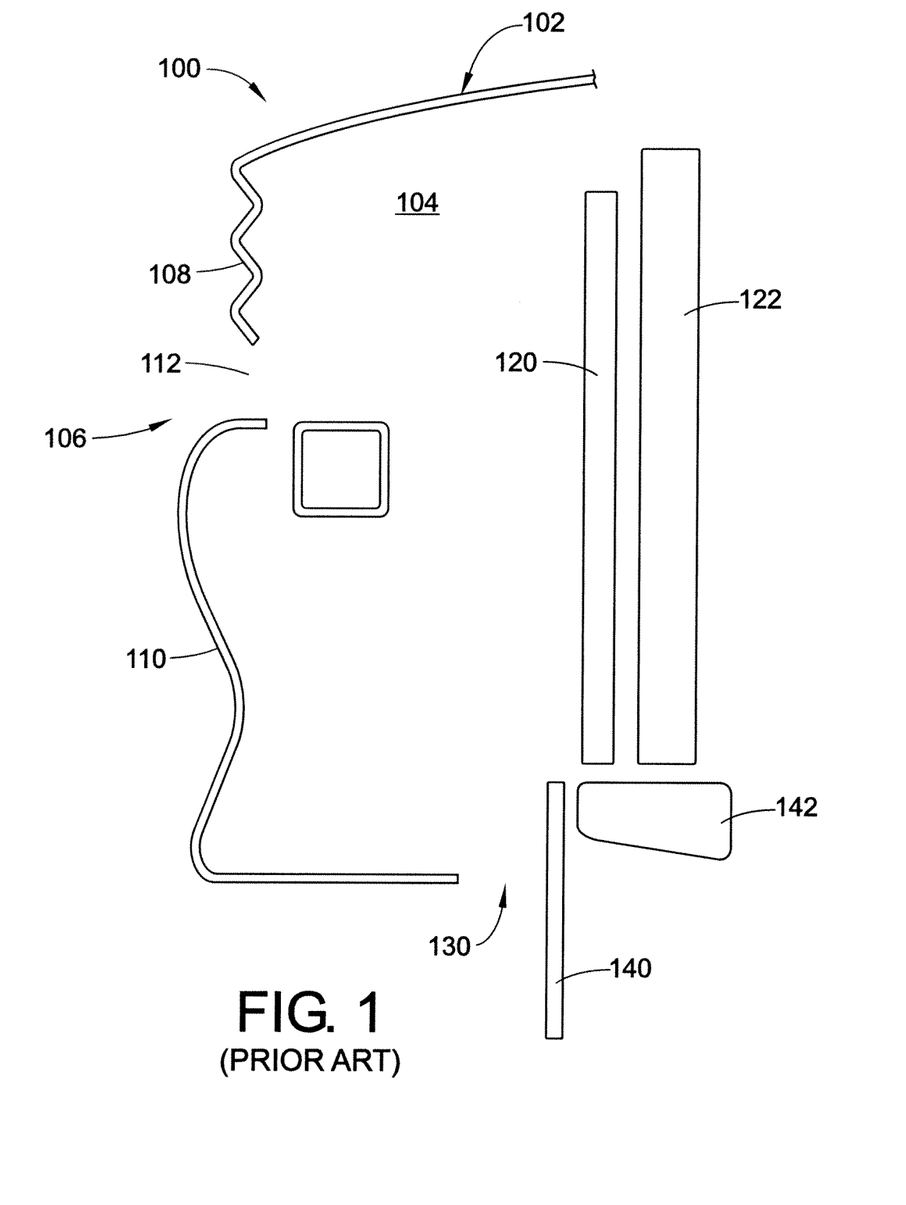
FIG. 1 is a schematic, cross-sectional representation of a front end of an automotive vehicle.

FIG. 1 illustrates a portion of a conventional automotive vehicle 100, particularly a front end 102 of the automotive vehicle. More specifically, an engine compartment 104 is shown with a number of vehicle components removed for ease of reference and understanding. A front fascia 106 of the vehicle may include a grille 108 and a lower fascia 110. In the illustrated embodiment, the grille 108 includes at least one opening 112 through which airflow may enter the engine compartment 104 along a first path for cooling the engine compartment and associated engine (not shown). At least a portion of this first path of the airflow preferably impinges on a condenser 120 and/or radiator 122. Further, a second or bottom opening 130 is preferably provided on the underside of the automotive vehicle and also communicates with the engine compartment 104.

Also illustrated in FIG. 1 is an air dam 140 that is mounted to the vehicle frame and preferably extends downwardly from mounting relation with a bulkhead 142. As shown, in this prior art arrangement, the air dam 140 is a generally simple structure mounted along an upper edge to the bulkhead 142 and preferably rearwardly of the bottom opening 130. The air dam 140 deflects air into the bottom opening 130 of the vehicle in a generally vertical direction where the air then moves rearwardly along a second airflow path that proceeds along a lower region of the engine compartment toward lower regions of the condenser 120 and/or radiator 122.

Figure 2:
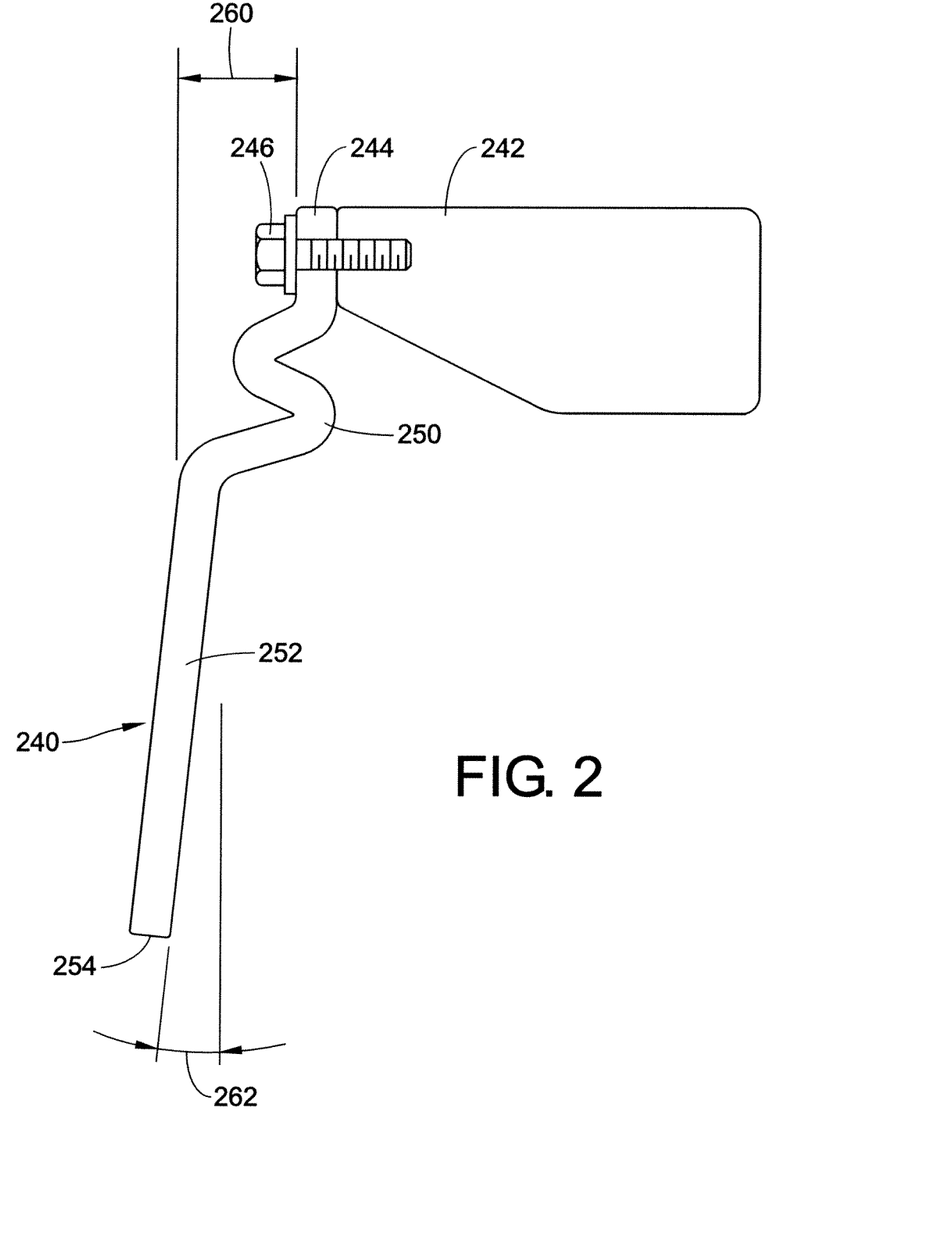
FIG. 2 is an enlarged side view of a modified air dam.

A first preferred embodiment of a modified air dam 240 of the present disclosure is shown in FIG. 2. Like FIG. 1, the air dam 240 of this embodiment is also secured along one edge, preferably along an upper edge 244, with the vehicle bulkhead 242. Specifically, one or more fasteners or mounting bolts 246 preferably extend through the upper portion 244 for securing the air dam to the vehicle frame. Alternative manners of securing the air dam can also be used without departing from the scope and intent of the present disclosure. The air dam extends downwardly and substantially in the same location as that shown in the arrangement of FIG. 1, i.e., disposed rearwardly of a bottom opening that communicates with the engine compartment. In this preferred embodiment, the air dam is modified to include an integral spring-like portion 250 incorporated into the structure of the air dam for absorbing impact forces that are imposed on the air dam. In the preferred arrangement, the spring-like portion is included in the upper portion of the air dam, shown here as adjacent and below the fasteners 246. One form of the spring-like portion 250 is a generally corrugate-shaped portion that is adapted to flex or deform like a bellows or in response to forces imposed on the air dam. Typically forces are generated as a result of a lower, terminal end portion 252 shown here as having a generally planar conformation and extending from the spring-like corrugation 250. The lower portion 252 depends downwardly from the underside of the vehicle (see FIG. 1) so that terminal end 254 occasionally engages a driveway, bumper block, curb, etc. since the air dam is formed from a generally rigid material, such as a stiff plastic. The forces are conveyed through the air dam and lead to potential damage to the air dam, or breakage or fracturing of the fastener mounting of the air dam with the vehicle frame. In order to minimize potential damage, the spring-like, corrugate portion 250 flexes and absorbs the impact of these forces.

It is also evident in FIG. 2 that lower, terminal end 254 is preferably horizontally offset from the upper portion 244, particularly where the upper portion is secured to the vehicle frame. This offset is represented by reference 262 and indicates a generally horizontal dimension. Of course one skilled in the art will appreciate that this horizontal dimension is representative only and different dimensions may be used and tuned to specific vehicle airflows.

Further, reference numeral 262 represents an angular orientation of the lower portion 252 of the air dam 240. Shown here, the angle 262 may be on the order of a few degrees from vertical so that the terminal end 254 is angled downwardly and toward the forward end of the vehicle i.e. toward the bottom opening that communicates with the engine compartment and toward the front end of the vehicle. The illustration in FIG. 2 is also representative of the unloaded (no or low airflow) conformation of the air dam. Once vehicle speed increases, the airflow pressure will exert a deflecting force on the surface of the lower portion 252 of the air dam as a result of the cantilever-type mounting provided at the upper end 244 of the air dam. In other words, the lower portion 252 will generally rotate rearwardly (in a generally counter-clockwise direction as illustrated) about the fastened upper end 244. Thus, at elevated vehicle speeds, sufficient force is generated to move the lower portion 252 toward a vertical orientation (toward offset plane 260). Of course the noted range of speeds should not be deemed limiting but rather is exemplary only.

Figure 3:
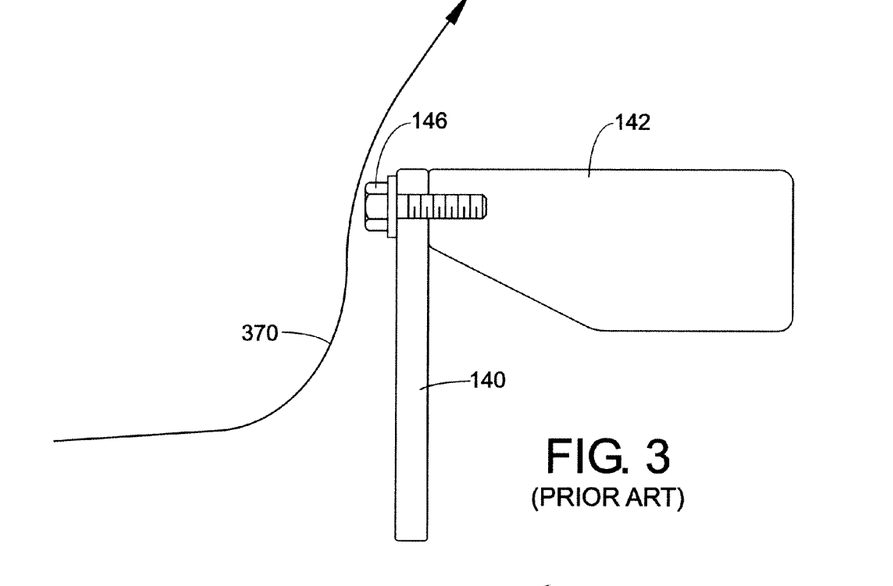
FIG. 3 is an enlarged view of an upper portion of the air dam secured to the vehicle.

FIG. 3 is a representation of the prior art mounting region of a conventional air dam to the vehicle frame or bulkhead. As is evident, fastener 146 extends outwardly from the end of a generally planar conformation of the prior art air dam 140 from the mounting region of the air dam with the bulkhead 142. Arrow 370 is representative of the airflow path adjacent the forward facing surface of the air dam as the air proceeds from the bottom opening 130 toward the condenser/radiator. The fastener 146 extends outwardly from this front face of the air dam and due to its protrusion, adds turbulence and interrupts the desired smoothly contoured airflow path along the air dam prior to being directed toward the condenser and radiator.

Figure 4:
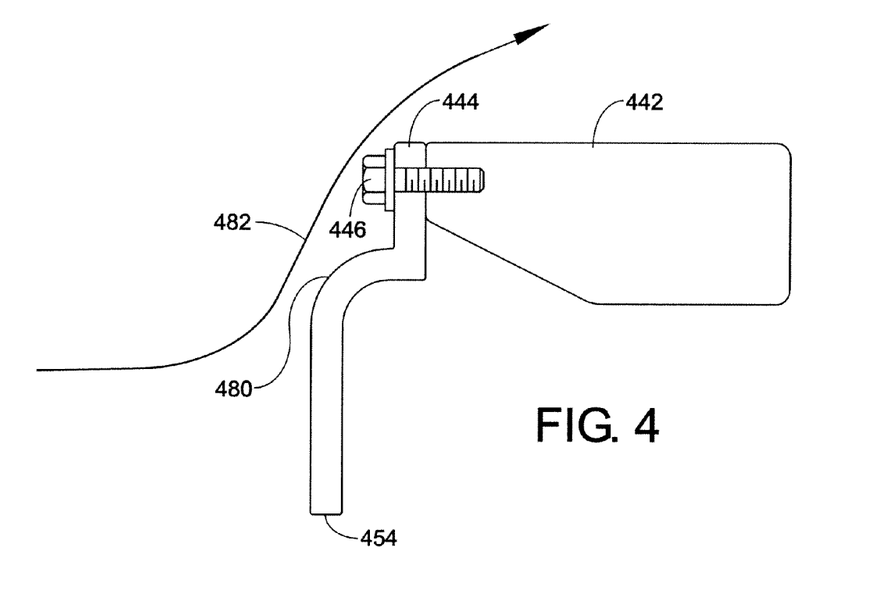
FIGS. 4 and 5 are enlarged views showing a different configuration of the air dam.
Figure 5:
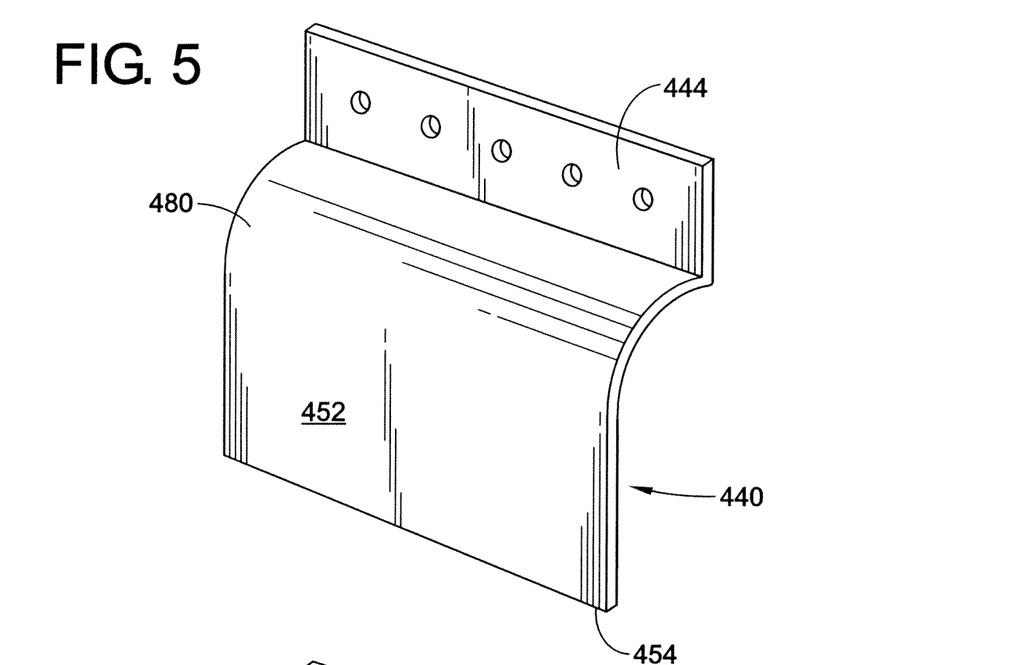

In FIGS. 4 and 5, a rounded region 480 is preferably provided in the air dam 440 to direct airflow along arrow 482 between the upper and lower portions 444, 454, respectively, of the air dam and to prevent turbulence as the air passes the fastener 446. The rounded region 480 serves the dual purpose of providing an offset (similar to offset 260 in FIG. 2 (which also incorporates a rounded region in the air dam) as well as allowing the air to make a sharper bend into the radiator. This makes the lower section of the radiator more effective since the dead spot that is experienced with the turbulent airflow in FIG. 3 is avoided by the more smoothly contoured airflow 482 of FIG. 4. A more efficient airflow provides for potential increase on the order of a 2% increase in efficiency for flow into the lower portion of the radiator when compared with prior arrangements.

Figure 6:
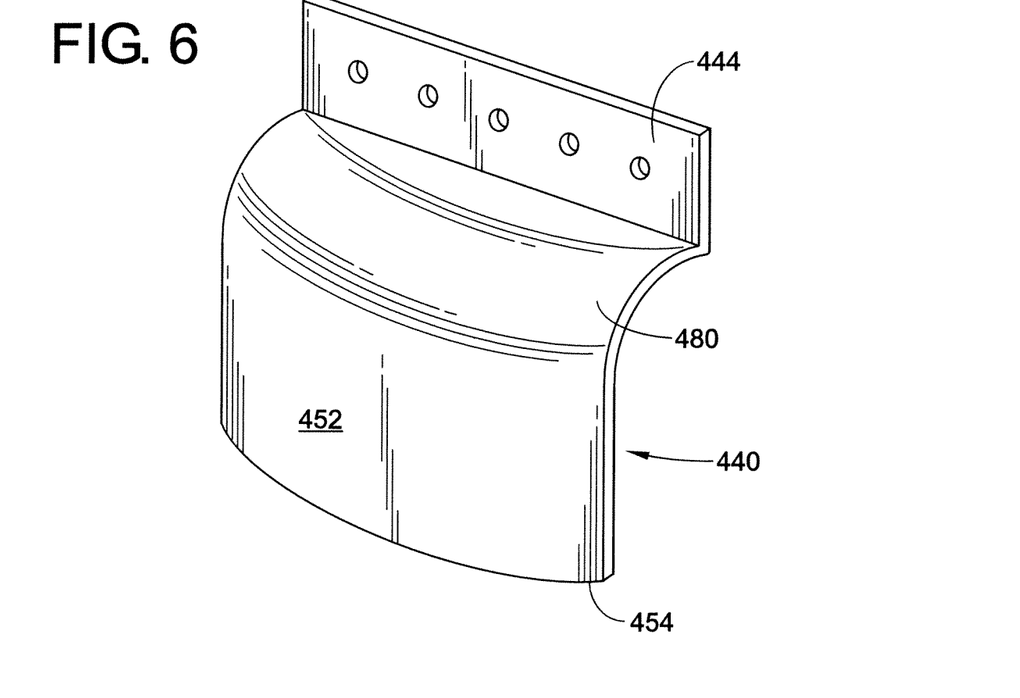
FIG. 6 is a perspective view showing side-to-side curvature of the air dam.

FIG. 6 shows a slight modification to the air dam 440 (which includes upper and lower portions 444, 454) of FIG. 5. Particularly, the air dam is curved side-to-side. This curved conformation 452 is desirable for reducing drag and improving aerodynamic airflow around the air dam. Of course one skilled in the art will recognize that this feature can be incorporated into any of the described embodiments of the present disclosure, and is not limited only to the arrangement of FIG. 6.

Figure 7:
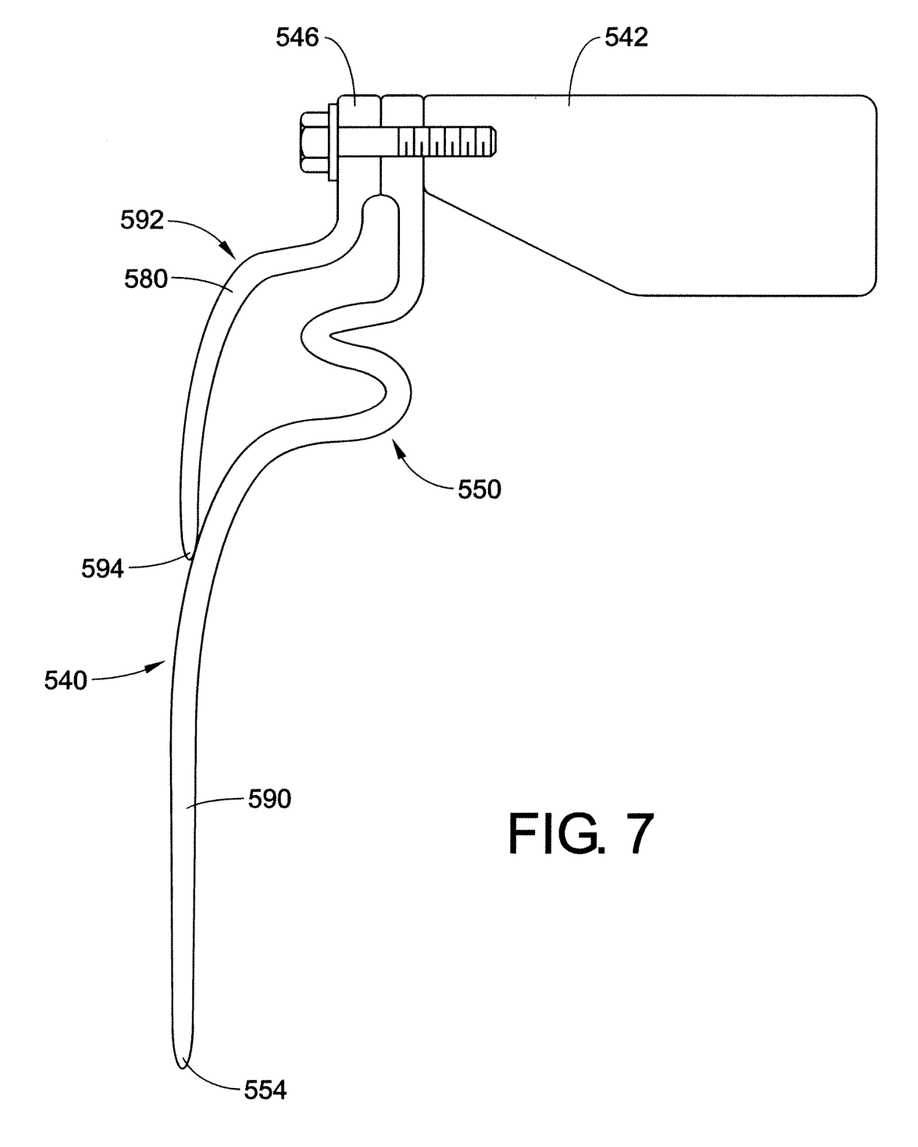
FIG. 7 is an enlarged view showing yet another configuration of the air dam.

Yet another embodiment is shown in FIG. 7. In this arrangement, selected functions of the air dam assembly are segregated into separate components of the air dam assembly. Reference numerals in the "500" series will be used to refer to like elements for ease of understanding. For example, the bulkhead is now referenced as item 542 and receives the air dam 540 shown here as a two-part, assembled structure, generally referenced as components 590, 592. The first component 590 is secured by fastener or mounting bolt 546 to the bulkhead 542. The first component 590 includes the integrated spring-like portion 550 that again has a generally corrugate-shape and that is adapted to flex in response to forces imposed on the first component 590 of the air dam. The terminal end 554 of the elongated first component 590 of the air dam is that portion most likely to inadvertently contact a driveway, bumper block, curb, etc. Thus, the corrugate-shaped, spring-like portion 550 is intended to deform when such forces are encountered and thereby limit the potential of fracturing the air dam assembly.

A second component 592 of the assembly is also mounted via fastener 546 to the bulkhead 542. The second component has a rounded region 580 that directs airflow around the upper portion of the air dam, namely around the spring-like portion 550 of the first component and is also laterally offset relative to the mounting region in order to direct the airflow around the fastening bolt 546. The second component has a terminal end 594 and a configuration that generally merges into the elongated, generally vertical portion of the first component. This still permits a streamlined airflow path from the opening and the bottom of the vehicle, along the air dam, and into the lower portion of the condenser/radiator of the vehicle. By separating the rounded region 580 of the second component into a component separate and apart from the first component 590, if any damage occurs to the first component, it is less likely to impact the structural and functional integrity of the second component 592. In this way, it is less probable that all of the advantages of the two-part air dam assembly would be adversely effected.

Figure 8:
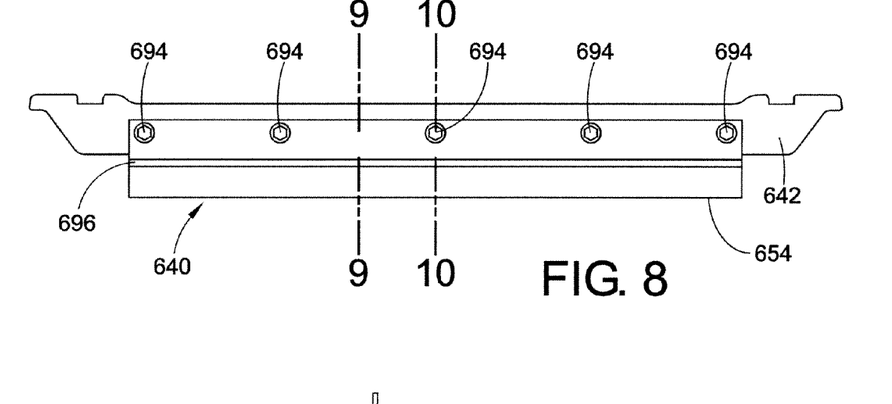
FIG. 8 is a plan view of still another embodiment of the air dam mounted to a bulkhead of the vehicle.
Figure 9:
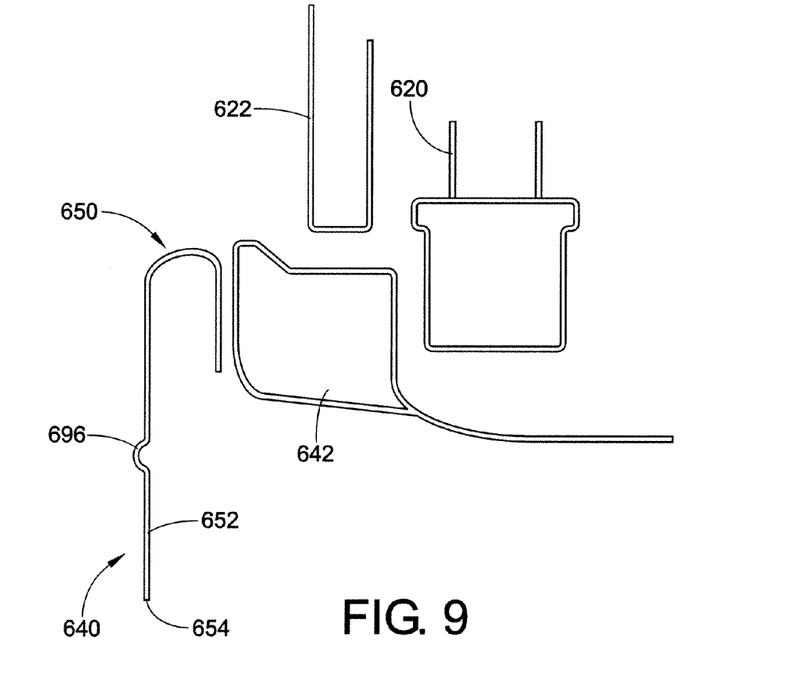
FIGS. 9 and 10 are sectional views taken generally along the lines 9-9 and 10-10 of FIG. 8.
Figure 10:
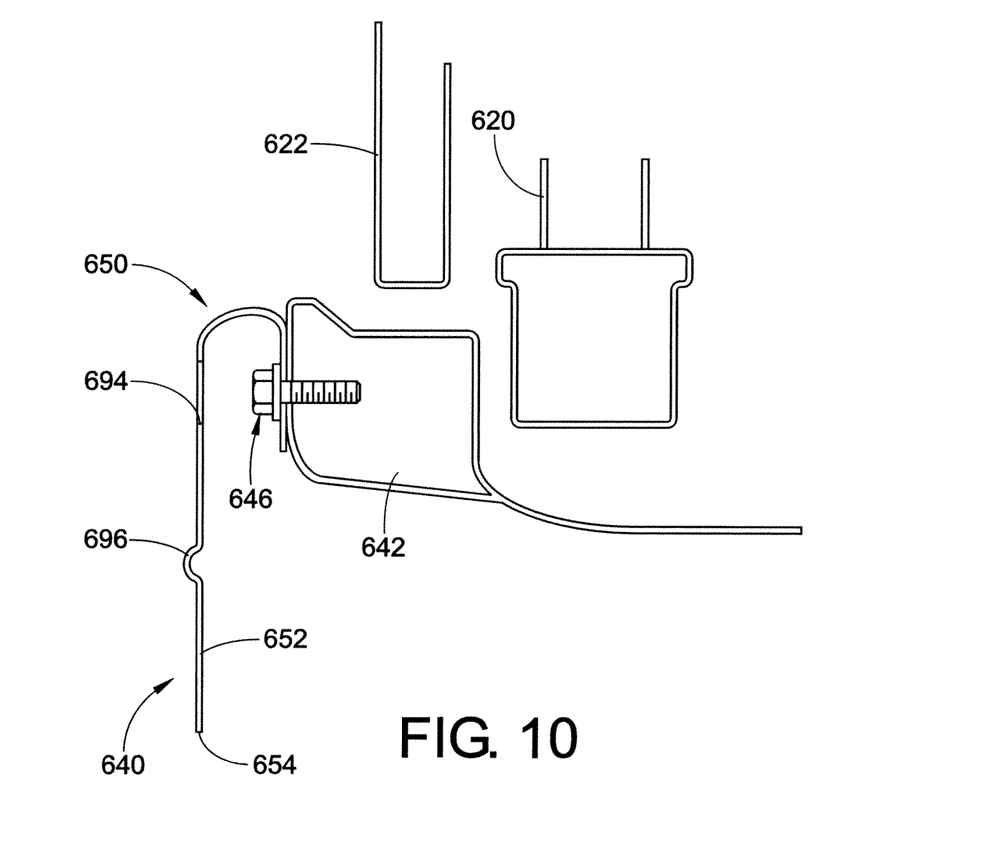

FIGS. 8-10 illustrate yet another embodiment of a preferred air dam arrangement. Air dam 640 includes an inverted, generally U-shaped bend 650 at its uppermost end that serves a similar function to the corrugate-like spring in the prior embodiments. Again, a fastener such as bolt 646 secures the air dam to the vehicle frame or bulkhead 642. The U-shaped bend 650 substantially encompasses or encloses the head of the fastener 646 so that openings 694 are provided at desired locations (shown in transversely spaced locations in FIG. 8) to allow access by an associated tool (not shown)

for removing or securing the air dam to the bulkhead. The precise number of access openings is intended to match the number of fasteners, although the total number of fasteners may vary. Likewise, the particular configuration of the openings may vary although circular openings are simple and prevent stress concentrations. This configuration of the U-shaped bend 650 disposed at the uppermost end of the air dam is desirable since it facilitates airflow around the bulkhead, fastener head, etc. and transitions the airflow path from a generally vertical airflow to a more horizontal airflow through the condenser/radiator. Thus, air directed by the air dam through the bottom breather opening of the vehicle is advantageously directed to a lower portion of the condenser 620/radiator 622.

The lower portion 652 of the air dam preferably has a generally planar conformation and a terminal end 654 that extends outwardly from an underside of the vehicle at a position located rearwardly of the bottom breather opening. As in prior embodiments, the generally planar portion 652 of the air dam may be angularly disposed and adapted for rearward deflection as vehicle speed increases.

Further, a transverse rib 696 extends across the generally planar portion to define a secondary or auxiliary bending region. As shown in FIGS. 8-10, the rib 696 extends across the entire transverse width of the air dam and at a location approximately mid-height between the U-shaped bend 650 and the terminal end 654. The rib 696 acts as a second bending region that can provide auxiliary bending after the generally U-shaped bend 650 has bottomed out against the bulkhead. If desired, the rib may be thinner than a thickness of the remainder of the air dam to facilitate bending, however it need not necessarily be thinner to still effectively function as a secondary bending region.

The efficiency of cooling air flow entering an automotive vehicle is improved by providing at least portions, if not all aspects, of the above described air dam embodiments. Airflows directed toward the bottom portion the radiator. Likewise, the method includes including a spring-like region in the air dam to absorb impact forces imposed on the air dam. Preferably, angling the air dam toward front of the vehicle from beneath the radiator will improve airflow, and the air dam can deflect toward a substantially vertical position in response to increased force resulting from increased vehicle speed. Contouring an upper portion of the air dam, preferably into a rounded surface provides for a desired offset and also directs airflow into the lower portion of the radiator.

These preferred embodiments provide for improved cooling performance as a result of optimizing the effectiveness of air entering the vehicle. Efficiency of the air dam is optimizing improved in a bottom breather application as shown and described above. More air can pass through the bottom of the radiator which is usually a dead zone as a result of using the rounded air dam to allow air to "bend" easier. Incorporating the spring-type device into an upper portion of the air dam limits or prevents structural damage to the air dam as a result of engaging a curb, or similar structure. As be appreciated, structural damage to the air dam has a negative impact on the cooling performance so that it is desirable to avoid deformation or breakage. Mounting the air dam at a slight negative angle allows the air dam to bend or grow back toward vertical at higher speeds vehicle. The improved airflow through the vehicle increases the efficiency of all air entering the vehicle by approximately 2% while having no impact on styling or aerodynamic features.

The disclosure has been described with reference to the preferred embodiments. Modifications and alterations will occur to others upon reading and understanding this specification. The present disclosure is intended to include all such modifications and alterations insofar as they come within the scope of the appended claims or the equivalents thereof.

We claim:

1. An apparatus for improving airflow through an engine compartment from a bottom opening of an automotive vehicle, the apparatus comprising:
   an air dam mounted in the engine compartment and extending generally vertically below a radiator, the air dam including a rounded portion for directing air flow toward the radiator.

2. The apparatus of claim 1 further including an integral spring-like portion for absorbing impact forces imposed on the air dam.

3. The apparatus of claim 2 wherein the air dam is mounted along an upper portion thereof in the engine compartment and the spring-like portion is included in the upper portion.

4. The apparatus of claim 3 wherein the spring-like portion includes one of an inverted, generally U-shaped portion or a generally corrugate-shaped portion adapted to flex in response to the forces imposed on the air dam.

5. The apparatus of claim 3 wherein a lower portion of the air dam is generally planar.

6. The apparatus of claim 5 wherein the lower portion of the air dam is slightly angled from a vertical plane toward a front of the vehicle.

7. The apparatus of claim 5 wherein the rounded portion interconnects the upper and lower portions.

8. The apparatus of claim 3 wherein the upper portion and the lower portion are horizontally offset.

9. The apparatus of claim 1 further comprising an auxiliary spring-like portion for absorbing impact forces imposed on the air dam.

10. The apparatus of claim 1 wherein a lower portion of the air dam is slightly angled from a vertical plane toward a front of the vehicle.

11. The apparatus of claim 1 wherein the lower portion of the air dam is configured to bend toward a substantially vertical plane at higher vehicle speeds.

12. An apparatus for improving an efficiency of cooling air flow entering an automotive vehicle, the apparatus comprising:
   an elongated air dam extending downwardly from beneath a radiator, the air dam having a mounting region cantilever mounted adjacent the radiator and having a terminal end region that is horizontally offset therefrom, and the air dam further including a rounded portion that extends over the mounting region for directing air flow into the radiator.

13. The apparatus of claim 12 wherein the air dam includes a spring-like portion interposed between the mounting region and the terminal end region.

14. The apparatus of claim 13 wherein the air dam has a first component that includes the spring-like portion for absorbing impact forces and a second component that has a rounded contour for improving aerodynamic airflow around the air dam.

15. The apparatus of claim 12 wherein the air dam has a curved side-to-side contour.

16. The apparatus of claim 12 wherein the air dam has a generally planar contour that is slightly angled toward a front of the automotive vehicle at low vehicle speeds and becomes substantially vertical at higher vehicle speeds.

17. A method of improving an efficiency of cooling air flow entering an automotive vehicle, the method comprising:
   providing an air dam for directing airflow toward a radiator;

including a spring-like region in the air dam for absorbing impact forces imposed thereon; and contouring an upper portion of the air dam to direct airflow into a lower portion of the radiator.

18. The method of claim 17 further comprising angling the air dam toward a front of the vehicle from beneath the radiator so that the air dam will deflect toward a substantially vertical position in response to increased force resulting from increased vehicle speed.

19. The method of claim 17 further comprising separating the spring-like region and the contoured upper portion into first and second components.

\* \* \* \* \*